(12) United States Patent
Gratton et al.

(10) Patent No.: US 8,827,150 B2
(45) Date of Patent: *Sep. 9, 2014

(54) 3-D MATRIX BARCODE PRESENTATION

(71) Applicant: EchoStar Technologies L.L.C., Englewood, CO (US)

(72) Inventors: Max Stephen Gratton, Lakewood, CO (US); David S. Atkinson, Denver, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/968,611

(22) Filed: Aug. 16, 2013

(65) Prior Publication Data

US 2014/0076963 A1 Mar. 20, 2014

Related U.S. Application Data

(63) Continuation of application No. 13/007,317, filed on Jan. 14, 2011, now Pat. No. 8,534,540.

(51) Int. Cl.
*G06F 17/30* (2006.01)

(52) U.S. Cl.
USPC ............ 235/375; 235/380; 235/440; 359/465

(58) Field of Classification Search
USPC .......................... 235/375, 380, 440; 359/465
See application file for complete search history.

(56) References Cited

U.S. PATENT DOCUMENTS

| | | | |
|---|---|---|---|
| 4,809,325 A | 2/1989 | Hayashi et al. | |
| 4,837,414 A | 6/1989 | Edamula | |
| 5,500,681 A | 3/1996 | Jones | |
| 5,510,603 A | 4/1996 | Hess et al. | |
| 5,581,636 A | 12/1996 | Skinger | |
| 5,602,377 A | 2/1997 | Beller et al. | |

(Continued)

FOREIGN PATENT DOCUMENTS

| | | |
|---|---|---|
| CN | 1571503 A | 1/2005 |
| CN | 101 227 581 A | 7/2008 |

(Continued)

OTHER PUBLICATIONS

"Android Tapp. Android App Reviews & Showcase Just a Tapp Away," Android Tapp, 10pp. Found online at http://www.androidtapp.com/download-the-weather-channel-android-app-from-your-tv/, Oct. 22, 2010.

(Continued)

*Primary Examiner* — Allyson Trail

(74) *Attorney, Agent, or Firm* — Kilpatrick Townsend & Stockton LLP

(57) ABSTRACT

A method for processing a matrix barcode displayed in three dimensions to extract data represented thereby involves capturing the component images of the three-dimensional representation. The method includes receiving a first component image of the matrix barcode and receiving a second component image of the matrix barcode as the two images are displayed on a display device. After the two images have been received, the first component image and the second component image of the matrix barcode are captured on an image capture device. Then depth information between elements of the matrix barcode presented in the first and second component images is determined and additional data represented in such depth information is extracted.

20 Claims, 9 Drawing Sheets

(56) References Cited

U.S. PATENT DOCUMENTS

| | | |
|---|---|---|
| 5,703,349 A | 12/1997 | Meyerson et al. |
| 5,959,285 A | 9/1999 | Schuessler |
| 5,978,855 A | 11/1999 | Metz et al. |
| 6,006,990 A | 12/1999 | Ye et al. |
| 6,058,238 A | 5/2000 | Ng |
| 6,438,751 B1 | 8/2002 | Voyticky et al. |
| 6,512,919 B2 | 1/2003 | Ogasawara |
| 6,556,273 B1 | 4/2003 | Wheeler et al. |
| 6,704,929 B1 | 3/2004 | Ozer et al. |
| 6,983,304 B2 | 1/2006 | Sato |
| 7,046,161 B2 | 5/2006 | Hayes |
| 7,206,029 B2 | 4/2007 | Cohen-Solal |
| 7,206,409 B2 | 4/2007 | Antonellis et al. |
| 7,221,405 B2 | 5/2007 | Basson et al. |
| 7,244,404 B2 | 7/2007 | Rosenberg et al. |
| 7,328,848 B2 | 2/2008 | Xia et al. |
| 7,349,668 B2 | 3/2008 | Ilan et al. |
| 7,369,180 B2 | 5/2008 | Xing |
| 7,387,250 B2 | 6/2008 | Muni |
| 7,394,519 B1 | 7/2008 | Mossman et al. |
| 7,424,976 B2 | 9/2008 | Muramatsu |
| 7,443,449 B2 | 10/2008 | Momosaki et al. |
| 7,487,527 B2 | 2/2009 | Ellis et al. |
| 7,587,601 B2 | 9/2009 | Levy et al. |
| 7,604,172 B2 | 10/2009 | Onogi |
| 7,612,748 B2 | 11/2009 | Tateuchi |
| 7,624,417 B2 | 11/2009 | Dua |
| 7,624,916 B2 | 12/2009 | Sato et al. |
| 7,673,297 B1 | 3/2010 | Arsenault et al. |
| 7,797,430 B2 | 9/2010 | Ichieda |
| 7,841,531 B2 | 11/2010 | Onogi |
| 8,010,977 B2 | 8/2011 | Hogyoku |
| 8,045,054 B2 | 10/2011 | Bishop et al. |
| 8,186,572 B2 | 5/2012 | Herzig |
| 8,292,166 B2 | 10/2012 | Gomez et al. |
| 8,364,018 B2 | 1/2013 | McArdle |
| 8,386,339 B2 | 2/2013 | Minnick et al. |
| 8,408,466 B2 | 4/2013 | Gratton |
| 8,427,455 B2 | 4/2013 | Matsuda |
| 8,430,302 B2 | 4/2013 | Minnick et al. |
| 8,439,257 B2 | 5/2013 | Beals et al. |
| 8,443,407 B2 | 5/2013 | Gaede et al. |
| 8,468,610 B2 | 6/2013 | Beals et al. |
| 8,511,540 B2 | 8/2013 | Anguiano |
| 8,534,540 B2 | 9/2013 | Gratton et al. |
| 8,550,334 B2 | 10/2013 | Gratton et al. |
| 8,553,146 B2 | 10/2013 | Kennedy |
| 2001/0037297 A1 | 11/2001 | McNair |
| 2001/0052133 A1 | 12/2001 | Pack et al. |
| 2002/0027612 A1 | 3/2002 | Brill et al. |
| 2002/0049980 A1 | 4/2002 | Hoang |
| 2002/0112250 A1 | 8/2002 | Koplar et al. |
| 2003/0018711 A1 | 1/2003 | Imanishi |
| 2003/0050854 A1 | 3/2003 | Showghi et al. |
| 2003/0121978 A1 | 7/2003 | Rubin et al. |
| 2003/0172374 A1 | 9/2003 | Vinson et al. |
| 2004/0019691 A1 | 1/2004 | Daymond et al. |
| 2004/0026508 A1 | 2/2004 | Nakajima et al. |
| 2004/0044532 A1 | 3/2004 | Karstens |
| 2004/0046790 A1 | 3/2004 | Agarwal et al. |
| 2005/0015800 A1 | 1/2005 | Holcomb |
| 2005/0015815 A1 | 1/2005 | Shoff et al. |
| 2005/0055281 A1 | 3/2005 | Williams |
| 2005/0059339 A1* | 3/2005 | Honda et al. ............... 455/3.01 |
| 2005/0125301 A1 | 6/2005 | Muni |
| 2005/0149967 A1 | 7/2005 | Hanley et al. |
| 2005/0180804 A1 | 8/2005 | Andrew et al. |
| 2005/0262548 A1 | 11/2005 | Shimojo et al. |
| 2005/0264694 A1 | 12/2005 | Ilan et al. |
| 2006/0064700 A1 | 3/2006 | Ludvig et al. |
| 2006/0071076 A1 | 4/2006 | Tamayama |
| 2006/0079247 A1 | 4/2006 | Ritter |
| 2006/0086796 A1 | 4/2006 | Onogi |
| 2006/0095286 A1 | 5/2006 | Kimura |
| 2006/0124742 A1 | 6/2006 | Rines et al. |
| 2006/0196950 A1 | 9/2006 | Kiliccote |
| 2006/0203339 A1 | 9/2006 | Kleinberger et al. |
| 2006/0208088 A1 | 9/2006 | Sekiguchi |
| 2006/0265731 A1 | 11/2006 | Matsuda |
| 2007/0016934 A1 | 1/2007 | Okada et al. |
| 2007/0016936 A1 | 1/2007 | Okada et al. |
| 2007/0017350 A1 | 1/2007 | Uehara |
| 2007/0019215 A1 | 1/2007 | Yu |
| 2007/0063050 A1 | 3/2007 | Attia et al. |
| 2007/0073585 A1 | 3/2007 | Apple et al. |
| 2007/0143788 A1 | 6/2007 | Abernethy et al. |
| 2007/0192723 A1 | 8/2007 | Anzelde et al. |
| 2007/0206020 A1 | 9/2007 | Duffield et al. |
| 2007/0256118 A1 | 11/2007 | Nomura et al. |
| 2008/0022323 A1 | 1/2008 | Koo |
| 2008/0059998 A1 | 3/2008 | McClenny et al. |
| 2008/0062164 A1 | 3/2008 | Bassi et al. |
| 2008/0073434 A1 | 3/2008 | Epshteyn et al. |
| 2008/0077324 A1 | 3/2008 | Hatano et al. |
| 2008/0082684 A1 | 4/2008 | Gaos et al. |
| 2008/0092154 A1 | 4/2008 | Hogyoku |
| 2008/0112615 A1 | 5/2008 | Obrea et al. |
| 2008/0156879 A1 | 7/2008 | Melick et al. |
| 2008/0182561 A1 | 7/2008 | Kim et al. |
| 2008/0189185 A1 | 8/2008 | Matsuo et al. |
| 2008/0200153 A1 | 8/2008 | Fitzpatrick et al. |
| 2008/0200160 A1 | 8/2008 | Fitzpatrick et al. |
| 2008/0201078 A1 | 8/2008 | Fitzpatrick et al. |
| 2008/0244675 A1 | 10/2008 | Sako et al. |
| 2008/0267537 A1 | 10/2008 | Thuries |
| 2008/0281624 A1 | 11/2008 | Shibata |
| 2008/0288600 A1 | 11/2008 | Clark |
| 2008/0307348 A1 | 12/2008 | Jones et al. |
| 2009/0029725 A1 | 1/2009 | Kindberg |
| 2009/0031071 A1 | 1/2009 | Chiu |
| 2009/0031373 A1 | 1/2009 | Hogyoku |
| 2009/0070699 A1 | 3/2009 | Birkill et al. |
| 2009/0083808 A1 | 3/2009 | Morrison |
| 2009/0088213 A1 | 4/2009 | Rofougaran |
| 2009/0094546 A1 | 4/2009 | Anzelde et al. |
| 2009/0108057 A1 | 4/2009 | Mu et al. |
| 2009/0113334 A1 | 4/2009 | Chakra et al. |
| 2009/0154759 A1 | 6/2009 | Koskinen et al. |
| 2009/0157511 A1 | 6/2009 | Spinnell et al. |
| 2009/0157530 A1 | 6/2009 | Nagamoto et al. |
| 2009/0172780 A1 | 7/2009 | Sukeda et al. |
| 2009/0179852 A1 | 7/2009 | Refai et al. |
| 2009/0180025 A1 | 7/2009 | Dawson |
| 2009/0212112 A1 | 8/2009 | Li et al. |
| 2009/0212113 A1 | 8/2009 | Chiu et al. |
| 2009/0234570 A1 | 9/2009 | Sever |
| 2009/0254954 A1 | 10/2009 | Jeong |
| 2009/0294538 A1 | 12/2009 | Wihlborg et al. |
| 2009/0303036 A1 | 12/2009 | Sahuguet |
| 2009/0307232 A1 | 12/2009 | Hall |
| 2009/0312105 A1 | 12/2009 | Koplar |
| 2010/0017457 A1 | 1/2010 | Jumpertz et al. |
| 2010/0020970 A1 | 1/2010 | Liu et al. |
| 2010/0031162 A1 | 2/2010 | Wiser et al. |
| 2010/0036936 A1 | 2/2010 | Cox et al. |
| 2010/0053339 A1 | 3/2010 | Aaron et al. |
| 2010/0081375 A1 | 4/2010 | Rosenblatt et al. |
| 2010/0089996 A1 | 4/2010 | Koplar |
| 2010/0096448 A1 | 4/2010 | Melick et al. |
| 2010/0103018 A1 | 4/2010 | Yoon et al. |
| 2010/0114715 A1 | 5/2010 | Schuster et al. |
| 2010/0129057 A1 | 5/2010 | Kulkarni |
| 2010/0131900 A1 | 5/2010 | Spetalnick |
| 2010/0131970 A1 | 5/2010 | Falcon |
| 2010/0131983 A1 | 5/2010 | Shannon et al. |
| 2010/0149187 A1 | 6/2010 | Slavin et al. |
| 2010/0154035 A1 | 6/2010 | Damola et al. |
| 2010/0161437 A1 | 6/2010 | Pandey |
| 2010/0163613 A1 | 7/2010 | Bucher et al. |
| 2010/0201894 A1 | 8/2010 | Nakayama et al. |
| 2010/0217663 A1 | 8/2010 | Ramer et al. |
| 2010/0225653 A1 | 9/2010 | Sao et al. |
| 2010/0261454 A1 | 10/2010 | Shenfield et al. |
| 2010/0262924 A1 | 10/2010 | Kalu |

(56) References Cited

U.S. PATENT DOCUMENTS

| | | |
|---|---|---|
| 2010/0262992 A1 | 10/2010 | Casagrande |
| 2010/0272193 A1 | 10/2010 | Khan et al. |
| 2010/0275010 A1 | 10/2010 | Ghirardi |
| 2010/0279710 A1 | 11/2010 | Dicke et al. |
| 2010/0295868 A1 | 11/2010 | Zahnert et al. |
| 2010/0301115 A1 | 12/2010 | Berkun |
| 2010/0313231 A1 | 12/2010 | Okamoto et al. |
| 2010/0319041 A1 | 12/2010 | Ellis |
| 2010/0327060 A1* | 12/2010 | Moran et al. ............... 235/440 |
| 2011/0000958 A1 | 1/2011 | Herzig |
| 2011/0030068 A1 | 2/2011 | Imai |
| 2011/0039573 A1 | 2/2011 | Hardie |
| 2011/0061003 A1 | 3/2011 | Miyazawa et al. |
| 2011/0065451 A1 | 3/2011 | Danado et al. |
| 2011/0087539 A1 | 4/2011 | Rubinstein et al. |
| 2011/0107386 A1 | 5/2011 | De Los Reyes et al. |
| 2011/0138408 A1 | 6/2011 | Adimatyam et al. |
| 2011/0208710 A1 | 8/2011 | Lesavich |
| 2011/0258058 A1 | 10/2011 | Carroll et al. |
| 2011/0264527 A1 | 10/2011 | Fitzpatrick et al. |
| 2011/0264530 A1 | 10/2011 | Santangelo et al. |
| 2011/0282727 A1 | 11/2011 | Phan et al. |
| 2011/0314485 A1 | 12/2011 | Abed |
| 2012/0096499 A1 | 4/2012 | Dasher et al. |
| 2012/0127110 A1 | 5/2012 | Amm et al. |
| 2012/0128267 A1 | 5/2012 | Dugan et al. |
| 2012/0130835 A1 | 5/2012 | Fan et al. |
| 2012/0130851 A1 | 5/2012 | Minnick et al. |
| 2012/0131416 A1 | 5/2012 | Dugan et al. |
| 2012/0137318 A1 | 5/2012 | Kilaru et al. |
| 2012/0138671 A1 | 6/2012 | Gaede et al. |
| 2012/0139826 A1 | 6/2012 | Beals et al. |
| 2012/0139835 A1* | 6/2012 | Morrison et al. ............ 345/157 |
| 2012/0142322 A1 | 6/2012 | Gomez |
| 2012/0151293 A1 | 6/2012 | Beals |
| 2012/0151524 A1 | 6/2012 | Kilaru et al. |
| 2012/0153015 A1 | 6/2012 | Gomez et al. |
| 2012/0153017 A1 | 6/2012 | Bracalente et al. |
| 2012/0155838 A1 | 6/2012 | Gerhards et al. |
| 2012/0158919 A1 | 6/2012 | Aggarwal et al. |
| 2012/0159563 A1 | 6/2012 | Gomez et al. |
| 2012/0168493 A1 | 7/2012 | Worms |
| 2012/0168510 A1 | 7/2012 | Gratton |
| 2012/0169928 A1 | 7/2012 | Casagrande et al. |
| 2012/0175416 A1* | 7/2012 | Gomez et al. ............... 235/380 |
| 2012/0181329 A1 | 7/2012 | Gratton et al. |
| 2012/0182320 A1 | 7/2012 | Beals et al. |
| 2012/0188112 A1 | 7/2012 | Beals et al. |
| 2012/0188442 A1 | 7/2012 | Kennedy |
| 2012/0198572 A1 | 8/2012 | Beals et al. |
| 2012/0199643 A1 | 8/2012 | Minnick et al. |
| 2012/0206648 A1 | 8/2012 | Casagrande et al. |
| 2012/0215830 A1 | 8/2012 | Anguiano |
| 2012/0217292 A1 | 8/2012 | Gratton et al. |
| 2012/0217293 A1 | 8/2012 | Martch et al. |
| 2012/0218470 A1 | 8/2012 | Schaefer |
| 2012/0218471 A1 | 8/2012 | Gratton |
| 2012/0222055 A1 | 8/2012 | Schaefer et al. |
| 2012/0222071 A1 | 8/2012 | Gaede et al. |
| 2012/0222081 A1 | 8/2012 | Schaefer et al. |
| 2012/0293327 A1 | 11/2012 | Mountain |
| 2013/0068838 A1 | 3/2013 | Gomez et al. |

FOREIGN PATENT DOCUMENTS

| | | |
|---|---|---|
| DE | 10 2007 038 810 A1 | 2/2009 |
| EP | 1 021 035 A1 | 7/2000 |
| EP | 1 383 071 A2 | 1/2004 |
| EP | 1 724 695 A1 | 11/2006 |
| EP | 1 757 222 A1 | 2/2007 |
| EP | 1 768 400 A2 | 3/2007 |
| EP | 2 079 051 A1 | 7/2009 |
| EP | 2 131 289 A1 | 12/2009 |
| EP | 2 439 936 A2 | 4/2012 |
| FR | 2 565 748 A1 | 12/1985 |
| GB | 2 044 446 A | 10/1980 |
| GB | 2 165 129 A | 4/1986 |
| GB | 2 311 451 A | 9/1997 |
| GB | 2 325 765 A | 12/1998 |
| GB | 2 471 567 A | 1/2011 |
| JP | 2002-215768 A | 8/2002 |
| JP | 2007-213548 A | 8/2007 |
| JP | 2008-244556 A | 10/2008 |
| KR | 2004 0087776 A | 10/2004 |
| WO | 95/27275 A1 | 10/1995 |
| WO | 97/41690 A1 | 11/1997 |
| WO | 01/06593 A2 | 1/2001 |
| WO | 01/18589 A1 | 3/2001 |
| WO | 01/58146 A2 | 8/2001 |
| WO | 2005/109338 A1 | 11/2005 |
| WO | 2007/009005 A1 | 1/2007 |
| WO | 2009/057651 A1 | 5/2009 |
| WO | 2009/144536 A1 | 12/2009 |
| WO | 2010/149161 A1 | 12/2010 |
| WO | 2011/009055 A2 | 1/2011 |

OTHER PUBLICATIONS

O'Sullivan, "Can Mobile Barcodes Work on TV?," India and Asia Pacific Mobile Industry Reports, Sep. 2009, 5 pp. Found online at http://gomonews.com/can-mobile-barcodes-work-on-tv/, Feb. 5, 2013.

"Fox TV Uses QR Codes," 2D Barcode Strategy, Sep. 2010, 6 pp. Found online at http://www.2dbarcodestrategy.com/2010/09/fox-tv-uses-qr-codes.html, Oct. 22, 2010.

"Fox's Fringe Uses QR Code," 2D Barcode Strategy, Oct. 2010, 4 pp. Found on the Internet at http://www.2dbarcodestrategy.com/2010/10/foxs-fringe-uses-qr-code.html, Oct. 22, 2010.

"Mobile Paths: QR Codes Come to TV," Mobile Behavior: An Omnicom Group Company, Sep. 2010, 8 pp. Found online at http://www.mobilebehavior.com/2010/09/27/mobile-paths-qr-codes-come-to-tv, Oct. 22, 2010.

"What Can I Do with the QR Barcode," Search Magnet Local-QR Barcode Technology, 2 pp. Found online at http://www.searchmagnetlocal.com/qr_barcode_technology.html, Oct. 22, 2010.

Byford, D., "Universal Interactive Device," International Business Machines Corporation, Jun. 1998, 1 page.

Costedio, K., "Bluefly QR Codes Debut on TV," 2 pp. Found online at http://www.barcode.com/Mobile-Barcode-news/bluefly-qr-codes-debut-on-tv.html, Oct. 22, 2010.

Extended European Search Report for EP 12152690.9 dated Jun. 19, 2012, 9 pages.

Gao, J., et al., "A 2D Barcode-Based Mobile Payment System," Multimedia and Ubiquitous Engineering, 2009, 10 pp. Found online at http://ieeexplore.ieee.org/Xplore/login.jsp?url=http%3A%2F%2Fieeexplore.ieee.org%2Fie . . . , Oct. 22, 2010.

International Search Report and Written Opinion of PCT/US11/59977 mailed on Mar. 19, 2012, 7 pages.

International Preliminary Report on Patentability of PCT/US2011/059977 mailed on Jun. 6, 2013, 6 pages.

International Search Report and Written Opinion of PCT/US11/60002 mailed on Feb. 15, 2012, 7 pages.

International Search Report and Written Opinion of PCT/US11/60094 mailed on Mar. 30, 2012, 7 pages.

International Search Report and Written Opinion of PCT/US11/60104 mailed on Mar. 29, 2012, 9 pages.

International Search Report and Written Opinion of PCT/US11/60121 mailed on Feb. 14, 2012, 7 pages.

International Search Report and Written Opinion of PCT/US11/61074 mailed on Jan. 6, 2012, 11 pages.

International Search Report and Written Opinion of PCT/US11/61211 mailed on Mar. 29, 2012, 8 pages.

International Search Report and Written Opinion of PCT/US11/61773 mailed on Feb. 21, 2012, 7 pages.

International Search Report and Written Opinion of PCT/US11/61778 mailed on Mar. 2, 2012, 7 pages.

(56) References Cited

OTHER PUBLICATIONS

International Search Report and Written Opinion of PCT/US11/63111 mailed on Apr. 4, 2012, 9 pages.
International Search Report and Written Opinion of PCT/US11/64709 mailed on Apr. 10, 2012, 8 pages.
International Search Report and Written Opinion of PCT/US2011/060098 mailed on Mar. 29, 2012, 10 pages.
International Search Report and Written Opinion of PCT/US2011/063308 mailed on Mar. 29, 2012, 10 pages.
International Search Report and Written Opinion of PCT/US2011/068161 mailed on Jun. 14, 2012, 19 pages.
International Preliminary Report on Patentability of PCT/US2011/068161 mailed on Jul. 25, 2013, 13 pages.
International Search Report and Written Opinion of PCT/US2011/068176 mailed on Mar. 29, 2012, 15 pages.
International Search Report and Written Opinion of PCT/US2012/021657 mailed on May 23, 2012, 12 pages.
International Search Report of PCT/US2012/022581 mailed on Oct. 8, 2012, 18 pages.
International Search Report and Written Opinion of PCT/US2012/022405 mailed on Apr. 19, 2012, 11 pages.
International Search Report and Written Opinion of PCT/US2012/024923 mailed on May 22, 2012, 12 pages.
International Search Report and Written Opinion of PCT/US2012/024956 mailed on Jun. 11, 2012, 10 pages.
International Search Report and Written Opinion of PCT/US2012/025502 mailed Jun. 8, 2012, 13 pages.
International Preliminary Report on Patentability of PCT/US2012/025502 mailed Sep. 6, 2013, 9 pages.
International Search Report and Written Opinion of PCT/US2012/025607 mailed Jun. 8, 2012, 13 pages.
International Search Report and Written Opinion of PCT/US2012/025634 mailed on May 7, 2012, 8 pages.
International Search Report and Written Opinion of PCT/US2012/026373 mailed Jun. 13, 2012, 14 pages.
International Search Report and Written Opinion of PCT/US2012/026624 mailed Aug. 29, 2012, 14 pages.
International Search Report and Written Opinion of PCT/US2012/026722 mailed Jun. 28, 2012, 11 pages.
International Search Report and Written Opinion of PCT/US2012/048032, mailed Oct. 16, 2012, 14 pages.
International Search Report of PCT/US11/60109 mailed on Feb. 14, 2012, 3 pages.
Liu, Yue et al., "Recognition of QR code with mobile phones," Control and Decision Conference, 2008. CCDC 2008. Jul. 2-4, 2008, pp. 203, 206.
Ngee, S., "Data Transmission Between PDA and PC Using WiFi for Pocket Barcode Application,"Thesis, University Teknologi Malaysia, May 2007, 126 pp. Found online at http://eprints.utm.my/6421/1/SeahYeowNgeeMFKE20007TTT.pdf, Oct. 22, 2010.
Olson, E., "Bar Codes add Detail on Items in TV Ads," New York Times, Sep. 2010, 3 pp. Found online at http:www.nytimes.com/2010/09/27/business/media/27bluefly.html?src=busin, Oct. 22, 2010.
Rekimoto, J., et al., "Augment-able Reality: Situated Communication Through Physical and Digital Spaces," Sony Computer Science Laboratory, 2002, 8 pp. Found online at Citeseer: 10.1.1.20.34[1].pdf, Oct. 22, 2010.
Schmitz, A., et al., "Ad-Hoc Multi-Displays for Mobile Interactive Applications," 31st Annual Conference of the European Association for Computer Graphics (Eurographics 2010), May 2010, vol. 29, No. 2, 8 pages.
Silverstein, B., "QR Codes and TV Campaigns Connect," ReveNews, Sep. 2010, 5 pp. Found online at http://www.revenews.com/barrysilverstein/qr-codes-and-tv-campaigns-connect/, Oct. 22, 2010.
Smith, L., "QR Barcodes Make History on Global TV," 3 pp. Found online at http://lindsaysmith.com/worlds-first-mobio-mini-telethon/, Oct. 22, 2010.
Yamanari, T., et al., "Electronic Invisible Code Display Unit for Group Work on Reminiscence Therapy," Proceedings of the International MultiConference of Engineers and Computer Scientists 2009, vol. 1, IMECS 2009, Mar. 2009, 6 pp. Retrieved from the Internet: http://citeseerx.ist.psu.edu/viewdoc/download?doi=10.1.1.145.6904&rep1&type=pdf.
Yang, C., et al., "Embedded Digital Information Integrated by Video-on-Demand System," Proceedings of the Fourth International Conference on Networked Computing and Advanced Information Management, IEEE Computer Society, 2008, 6 pages.
U.S. Appl. No. 12/958,073, filed Dec. 1, 2010, Office Action mailed Aug. 31, 2012, 12 pages.
U.S. Appl. No. 12/958,073, filed Dec. 1, 2010, Notice of Allowance mailed Jan. 17, 2013, 17 pages.
U.S. Appl. No. 12/961,369, filed Dec. 6, 2010, Non-Final Office Action mailed Mar. 9, 2012, 17 pages.
U.S. Appl. No. 12/964,478, filed Dec. 9, 2010, Non-Final Office Action mailed Mar. 26, 2013, 19 pages.
U.S. Appl. No. 12/964,478, filed Dec. 9, 2010, Final Office Action mailed Sep. 16, 2013, 12 pages.
U.S. Appl. No. 12/971,349, filed Dec. 17, 2010, Office Action mailed Nov. 10, 2011, 9 pages.
U.S. Appl. No. 12/971,349, filed Dec. 17, 2010, Final Office Action mailed Jan. 20, 2012, 10 pages.
U.S. Appl. No. 12/961,369, filed Dec. 6, 2010, Final Rejection mailed Oct. 30, 2012, 17 pages.
U.S. Appl. No. 12/961,369, filed Dec. 6, 2010, Non-Final Office Action mailed Mar. 25, 2013, 17 pages.
U.S. Appl. No. 12/961,369, filed Dec. 6, 2010, Non-Final Office Action mailed Jul. 12, 2013, 22 pages.
U.S. Appl. No. 12/961,369, filed Dec. 6, 2010, Non-Final Office Action mailed Feb. 13, 2014, 21 pages.
U.S. Appl. No. 12/971,349, filed Dec. 7, 2010, Notice of Allowance mailed Oct. 2, 2013, 24 pages.
U.S. Appl. No. 12/971,349, filed Dec. 7, 2010, Final Rejection mailed Oct. 24, 2012, 11 pages.
U.S. Appl. No. 12/971,349, filed Dec. 17, 2010, Office Action mailed Jul. 16, 2012, 11 pages.
U.S. Appl. No. 12/981,244, filed Dec. 29, 2010, Office Action mailed Dec. 21, 2012, 23 pages.
U.S. Appl. No. 12/981,244, filed Dec. 29, 2010, Final Office Action mailed Oct. 30, 2013, 10 pages.
U.S. Appl. No. 12/984,385, filed Jan. 4, 2011, Notice of Allowance mailed Nov. 28, 2012, 11 pages.
U.S. Appl. No. 12/984,385, filed Jan. 4, 2011, Office Action mailed Jul. 12, 2012, 16 pages.
U.S. Appl. No. 12/986,721, filed Jan. 7, 2011, Office Action mailed Mar. 16, 2012, 6 pages.
U.S. Appl. No. 12/986,721, filed Jan. 7, 2011, Notice of Allowance mailed Jun. 21, 2012, 7 pages.
U.S. Appl. No. 12/953,227, filed Nov. 23, 2010, Final Office Action mailed May 24, 2013, 17 pages.
U.S. Appl. No. 12/953,227, filed Nov. 23, 2010, Office Action mailed Nov. 7, 2012, 31 pages.
U.S. Appl. No. 13/015,382, filed Jan. 27, 2011, Office Action mailed Nov. 13, 2012, 7 pages.
U.S. Appl. No. 13/015,382, filed Jan. 27, 2011, Notice of Allowance mailed Feb. 22, 2013, 12 pages.
U.S. Appl. No. 13/016,483, filed Jan. 28, 2011, Office Action mailed Nov. 2, 2012, 18 pages.
U.S. Appl. No. 13/016,483, filed Jan. 28, 2011, Final Office Action mailed Jun. 27, 2013, 13 pages.
U.S. Appl. No. 12/953,273, filed Nov. 23, 2010, Notice of Allowance mailed Oct. 18, 2012, 11 pages.
U.S. Appl. No. 12/965,645, filed Dec. 10, 2010, Non-Final Office Action mailed Jul. 19, 2013, 20 pages.
U.S. Appl. No. 12/973,431, filed Dec. 20, 2010, Non-Final Rejection mailed May 15, 2013, 30 pages.
U.S. Appl. No. 12/973,431, filed Dec. 20, 2010, Final Office Action mailed Aug. 27, 2013, 11 pages.
U.S. Appl. No. 13/007,317, filed Jan. 14, 2011, Office action mailed Dec. 19, 2012, 29 pages.
U.S. Appl. No. 13/010,557, filed Jan. 20, 2011, Final Rejection mailed Jan. 16, 2014, 17 pages.

(56) References Cited

OTHER PUBLICATIONS

U.S. Appl. No. 13/010,557, filed Jan. 20, 2011, Non-Final Rejection mailed Aug. 5, 2013, 17 pages.
U.S. Appl. No. 13/014,591, Notice of Allowance mailed May 24, 2013, 32 pages.
U.S. Appl. No. 13/020,678, filed Feb. 3, 2011, Office Action mailed Jul. 30, 2012, 15 pages.
U.S. Appl. No. 13/020,678, filed Feb. 3, 2011, Notice of Allowance mailed Jan. 3, 2013, 13 pages.
U.S. Appl. No. 13/007,317, Notice of Allowance mailed May 13, 2013, 16 pages.
U.S. Appl. No. 13/028,030, filed Feb. 15, 2011, Office Action mailed Nov. 11, 2013, 14 pages.
U.S. Appl. No. 13/031,115, Notice of Allowance mailed Apr. 16, 2013, 24 pages.
U.S. Appl. No. 13/034,482, filed Feb. 24, 2011, Final Office Action mailed Apr. 25, 2013, 19 pages.
U.S. Appl. No. 13/034,482, filed Feb. 24, 2011, Office Action mailed Oct. 19, 2012, 11 pages.
U.S. Appl. No. 13/035,474, filed Feb. 25, 2011, Office Action mailed Oct. 30, 2012, 11 pages.
U.S. Appl. No. 13/035,474, filed Feb. 25, 2011, Final Rejection mailed Mar. 29, 2013, 20 pages.
U.S. Appl. No. 13/035,474 filed Feb. 25, 2011, Non Final Rejection mailed Mar. 6, 2014, 20 pages.
U.S. Appl. No. 12/960,285, filed Dec. 3, 2010, Final Office Action mailed Apr. 18, 2013, 14 pages.
U.S. Appl. No. 12/960,285, filed Dec. 3, 2010, Non-Final Office Action mailed Dec. 6, 2012, 17 pages.
U.S. Appl. No. 13/006,270, filed Jan. 13, 2011, Non-Final Office Action mailed Oct. 8, 2013, 20 pages.
U.S. Appl. No. 13/028,030, filed Feb. 15, 2011, Non-Final Office Action mailed Dec. 17, 2013, 60 pages.
U.S. Appl. No. 13/035,525, filed Feb. 25, 2011, Office Action mailed Jul. 18, 2012, 15 pages.
U.S. Appl. No. 13/035,525, filed Feb. 25, 2011, Final Office Action mailed Jan. 31, 2013, 26 pages.
U.S. Appl. No. 13/035,525, filed Feb. 25, 2011, Non-Final Office Action mailed May 15, 2013, 15 pages.
U.S. Appl. No. 13/035,525, filed Feb. 25, 2011, Final Office Action mailed Sep. 12, 2013, 21 pages.
U.S. Appl. No. 13/37,302, filed Feb. 28, 2011, Office Action mailed Mar. 1, 2013, 20 pages.
U.S. Appl. No. 13/037,302, filed Feb. 28, 2011, Final Office Action mailed Oct. 16, 2013, 28 pages.
U.S. Appl. No. 13/037,312, filed Feb. 28, 2011, Office Action mailed Aug. 15, 2012, 9 pages.
U.S. Appl. No. 13/037,312, filed Feb. 28, 2011, Final Office Action mailed Feb. 28, 2013, 18 pages.
U.S. Appl. No. 13/037,316, filed Feb. 28, 2011, Office Action mailed Jan. 30, 2013, 21 pages.
U.S. Appl. No. 13/037,316, filed Feb. 28, 2011, Final Office Action mailed Aug. 28, 2013, 13 pages.
U.S. Appl. No. 13/037,333, filed Feb. 28, 2011, Notice of Allowance mailed Jan. 18, 2013, 27 pages.
U.S. Appl. No. 13/192,287, filed Jul. 27, 2011, Final Office Action mailed Jan. 28, 2014, 18 pages.
U.S. Appl. No. 13/192,287, filed Jul. 27, 2011, Non Final Office Action mailed Jun. 13, 2013, 22 pages.
U.S. Appl. No. 13/673,480, filed Nov. 9, 2012, Office Action mailed Jan. 16, 2013, 27 pages.
U.S. Appl. No. 13/673,480, filed Nov. 9, 2012, Final Office Action mailed Sep. 9, 2013, 10 pages.
U.S. Appl. No. 13/673,480, filed Nov. 9, 2012, Notice of Allowance mailed Nov. 12, 2013, 16 pages.
U.S. Appl. No. 13/475,794, filed May 18, 2012, Non-Final Office Action mailed Sep. 18, 2013, 19 pages.

* cited by examiner

3-D MATRIX BARCODE PRESENTATION

FIELD

The present disclosure relates generally to audiovisual content and, more specifically, to presenting a three-dimensional matrix barcode along with audiovisual content.

BACKGROUND

Audiovisual content (e.g., television programming) may often be used to transmit information to viewers. This information may include incentives, coupons, and so on. For example, a clothing store may advertise on a certain television channel and display the address, telephone number and the like of the clothing store. However, some users may have difficulty remembering portions or all of the information.

Information such as an address, telephone number, store name, and so on may foe stored in a quick response (QR) code. A QR code is a matrix barcode that may be readable by mobile phones with a camera, smart phones, computing devices, specialized scanners, and so on. The matrix barcode may consist of black blocks or modules arranged in a pattern against a white background. The information encoded within the matrix barcode may be text uniform resource indicator (URI), alphanumeric, numeric and other data. Matrix barcodes storing addresses and URIs may appear in magazines, on signs, buses, business cards, other objects where users may desire information, and so on. Users with, a camera phone or other mobile device equipped with the correct reader application can convert a photographic image of the matrix barcode to display text, contact information, connect to a wireless network, open a webpage in the phone's browser, and so on.

A number of display devices, such as televisions, may be configured to present three dimensional (3-D) images and/or 3-D video. These display devices may display content that appears as a 3-D image when viewed through 3-D-specific glasses. For example, the display device may display two images superimposed on each other, where each image is projected through a different polarizing filter. The viewer may view the image through a pair of glasses having a pair of lenses with different polarized orientations. The first orientation may correspond to the first filtered image and the second orientation may correspond to the second filtered image. Thus, as the image is displayed on the screen, each eye of the viewer may perceive a different image. This creates a 3-D image (as viewed by the viewer) as each eye sees the same image, but at a slightly different angle.

Other techniques such as anaglyphic, alternative-frame sequencing, and autosteroscopic may also be used to create a 3-D appearance on a display device. These techniques (either with or without specialized lenses) present one version of the image to a left eye of the viewer and a second version of the image to the right eye of the viewer. The two images may be the same image (or substantially the same) but be slightly offset from each other. As the human eye processes the two images together, the brain sees a 3-D image. These 3-D techniques may be used to display audiovisual content in 3-D. For example, many movies may be presented in 3-D to allow a user to have a more interactive movie-watching experience.

The information included in this Background section of the specification, including any references cited herein and any description or discussion thereof, is included for technical reference purposes only and is not to be regarded subject matter by which the scope of the invention as defined in the claims is to be bound.

SUMMARY

In one embodiment, a system for capturing a three-dimensional (3-D) matrix barcode may include an optical device, a content receiver in communication with the optical device, and a display device in communication with the content receiver. The content receiver may receive a broadcast signal including a matrix barcode. Once the content receiver has received the broadcast signal, it may analyze the broadcast signal in order to determine depth data for the matrix barcode. Once the depth data has been determined, the content receiver may process the matrix barcode so that the matrix barcode may be displayed in three dimensions when presented to a viewer. The display device may then display the matrix barcode so that when viewed by a viewer the matrix barcode appears in three dimensions.

In another embodiment, a method for capturing and transmitting a matrix barcode displayed in three dimensions may be implemented on a computer system. The method may include receiving a first image of the matrix barcode and receiving a second image of the matrix barcode, as the two images are displayed on a display device. After the two images have been received, the first image and the second image of the matrix barcode may foe captured on a capture device. Then, the first image and the second image of the matrix barcode may be transmitted to a processor.

In still other embodiments, a method may be implemented on a computer system wherein a first component image of a matrix barcode and a second component image of the matrix barcode are received. The first component image and the second component image may correspond to a three-dimensional representation of the matrix barcode (when perceived by a viewer). After the two images are received, the first component image and the second component image may be captured on an image capture device. Then, depth information between elements of the matrix barcode presented in the first and second component images may be captured on an image capture device.

In another embodiment, a computer program product comprising computer-executable instructions for performing a computer process stored in a non-transitory storage medium may include operations to receive a broadcast signal having a matrix barcode and configure to the matrix barcode to be displayed in three dimensions. Configuring the matrix barcode to be displayed in three dimensions may include adding at least one depth block to the matrix barcode. The computer program may include an operation to transmit the matrix barcode and the at least one depth block to a display device after the matrix barcode has been configured to be displayed in three dimensions.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention as defined in the claims is provided in the following written description of various embodiments of the invention and illustrated in the accompanying drawings.

DETAILED DESCRIPTION

Figure 1A:
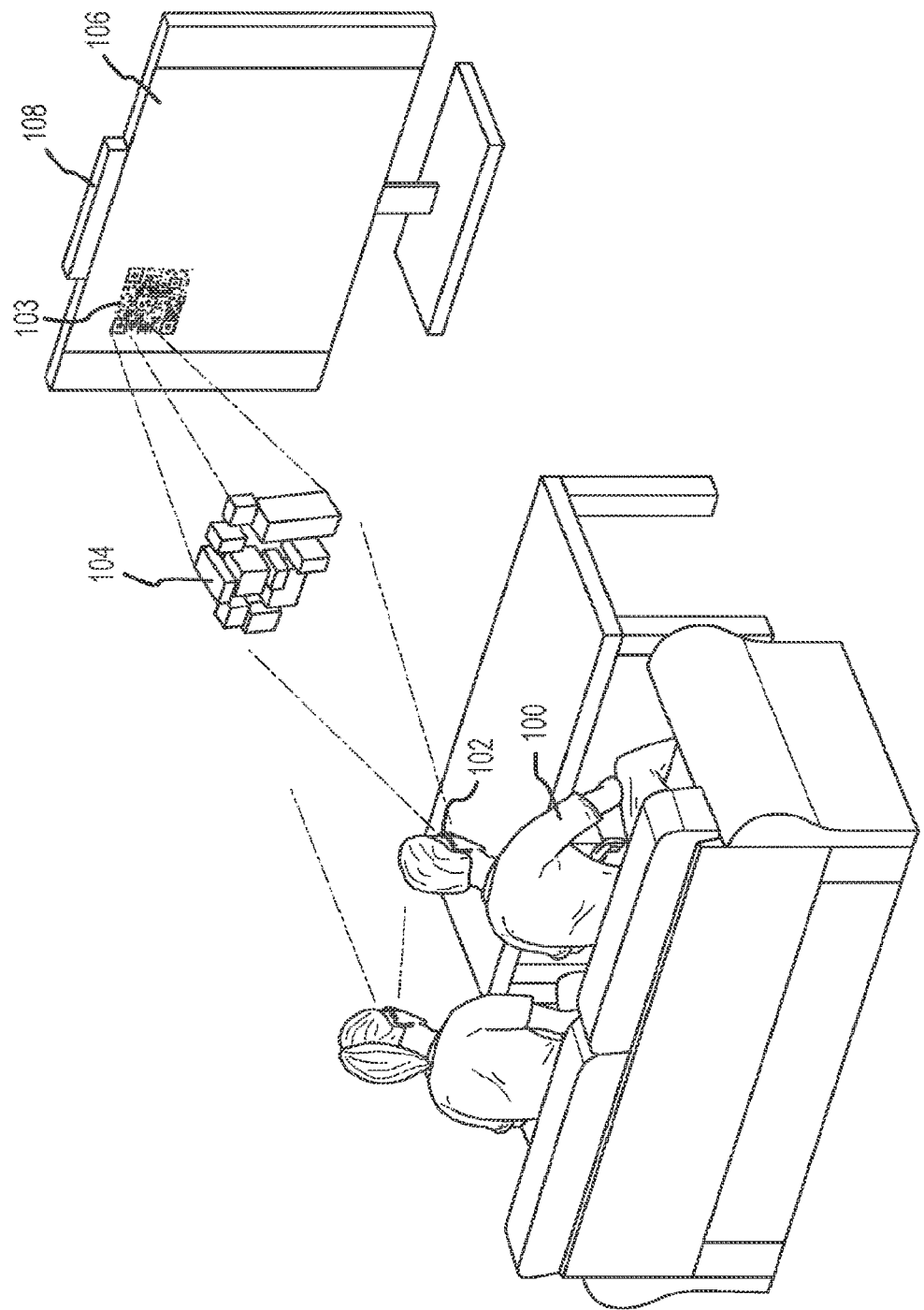
FIG. 1A is an illustration of a viewer capturing a portion of a matrix barcode projected in 3-D from a display device via an image capture device incorporated into an optical device.

Various examples of a system to display a matrix barcode in 3-D along with or superimposed on a video content display are described herein. Using a display device, 3-D processing, and/or other 3-D display techniques, the matrix barcode may be displayed at varying depths and/or perspectives as viewed by the viewer. This may allow for additional data to foe included within the matrix barcode. Additionally, an image capture device provided within an image viewer device may capture the matrix barcode and depth information associated with the 3-D projection of the matrix barcode.

In some embodiments, the matrix barcode may be projected in 3-D via two related component images. For example. In one embodiment a first component image and a second component image may be displayed in alternating frames (e.g., even frames may display the first component image and odd frames may display the second component image) at a specified frame rate. The frame rate may be selected such that when the first component image and the second component image are viewed by a viewer wearing an appropriate image viewer device, i.e., a pair of synchronized shutter glasses, the two component images may be "combined" by a viewer to create the appearance of a 3-D image. In other embodiments, the two component images may be displayed simultaneously, but offset from one another. Using an image viewer device, e.g., glasses with orthogonally polarized lenses, each component image may only be viewed by one eye of the viewer (i.e., the first component image may be resolved to the right eye and the second component image may be resolved to the left eye). In these embodiments, the two component images may be similar or may be slightly different from one another.

In other embodiments, the matrix barcode may be displayed in varying colors in order to convoy additional data/information. The matrix barcode may be used to relay numerous types of data and may be easily transmitted and/or transferred to other electronic device(s).

A person (viewer) may record/capture the matrix barcode via a capture device (e.g., a camera with a rotating polarizing filter). Some 3-D content may require the viewer to wear specialized tenses or glasses so that the images/content may appear in 3-D. In these embodiments, the lenses or glasses (image viewer device) may include the image capture device (e.g., a camera) in order to capture the matrix barcode. In other embodiments, the image capture device may be incorporated into a mobile computing device, for example, a remote control having a camera, a digital camera, a smart phone with a camera, or other device that can record an image. These embodiments may be beneficial as some 3-D projection/display technologies may not require specialized lenses to view the 3-D images.

The image capture device may then transmit the matrix barcode and/or data included within the matrix barcode to a computing device such as a computer, a tablet computer, or a smart phone. In embodiments where the image capture device is incorporated info the mobile computing device, the matrix barcode may not need to be transmitted. The computing device may then access the data, content or other information corresponding to or stored in the matrix barcode. For example, the matrix barcode may include data corresponding to a website address, department store contact information (e.g., address, phone number), a coupon code, information relating to audiovisual content e.g., channel information, time, and date for a movie or television show), and so on. In these embodiments, the computing device may then access the content corresponding to the data, e.g., the computing device may open a browser window and access the website or download (from the Internet) the content.

In other embodiments, the image capture device may transmit the matrix barcode and/or data included within the matrix barcode to a content receiver, such as a set top box. For example, the matrix barcode may include data corresponding to a television show (e.g., show name, time the show is on, channel). After the content receiver receives the matrix barcode it may locate the television snow and record the content or transmit the content to a display device.

Figure 1B:
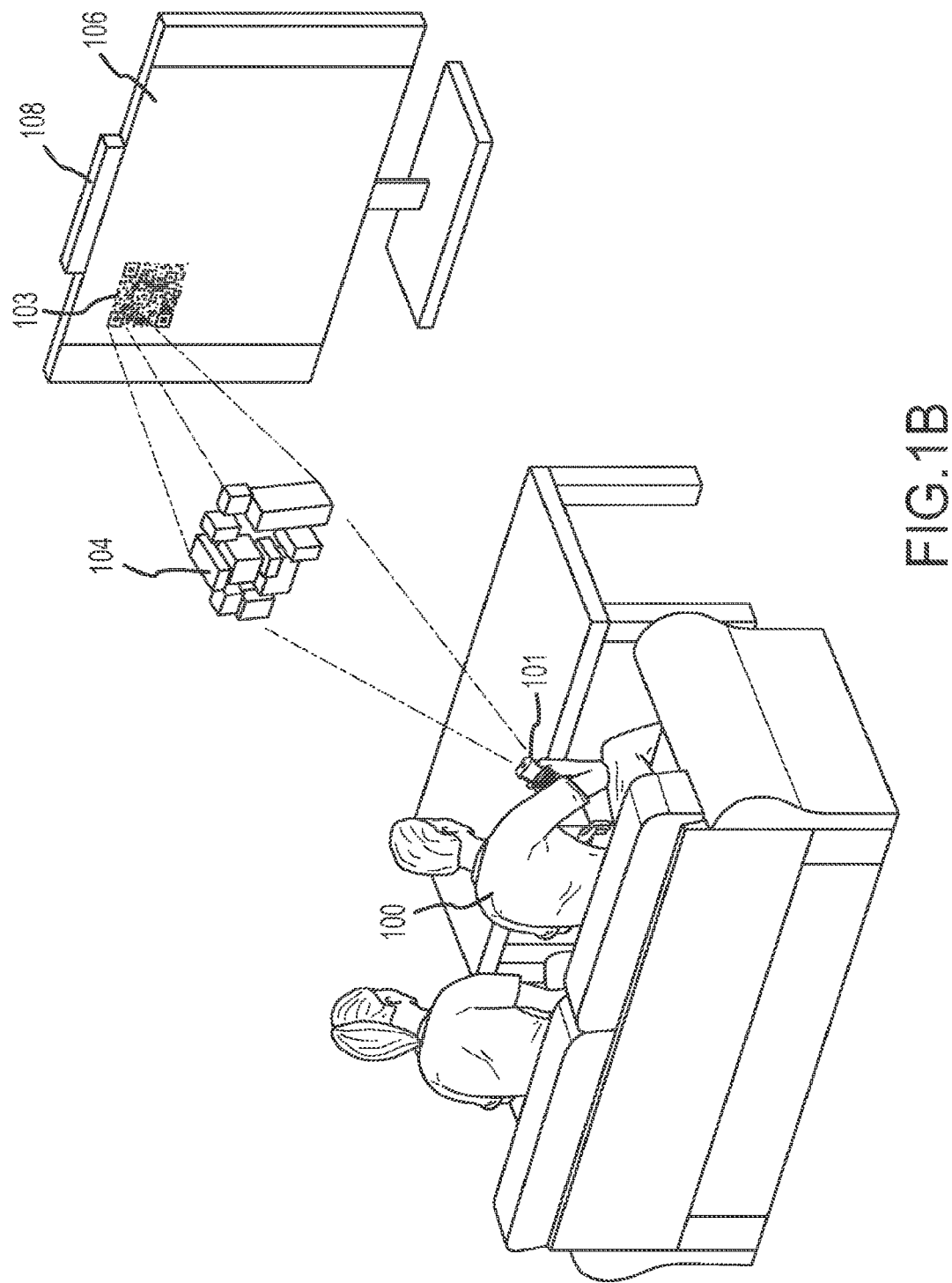
FIG. 1B is an illustration of the viewer capturing the portion of the matrix barcode projected in 3-D from a display device via a mobile computing device with the image capture component.

FIG. 1A depicts an embodiment in which a viewer 100 uses an image viewer device 102 to view and capture a portion 104 of a matrix barcode 103 displayed on a display device 106 receiving content from a content receiver 108. FIG. 1B depicts an embodiment in which the viewer 100 uses a computing device 101 to capture and transmit the portion of the matrix barcode 104 displayed on the display device 108. The display device 106 (e.g., television) and/or content receiver 108 (e.g., set fop box, digital video recorder, computer) may be configured to display content (e.g., television programming) that may appear in 3-D to the viewer 100.

As illustrated in FIGS. 1A and 1B a two-dimensional (2-D) matrix barcode 103 is presented on a display device 106 is projected in 3-D. The 3-D matrix barcode 104 is depicted in FIGS. 1A and 1B as only a portion of the 2-D matrix barcode 103; however, this is for illustration purposes only, in many embodiments the entire 2-D matrix barcode 103 may be projected in 3-D. Therefore, the 3-D portion of the matrix barcode 104 will be referred to herein as the matrix barcode.

The matrix barcode 104 and the content displayed may appear to the viewer in 3-D as each eye of the viewer 102 may be provided with two slightly different images. The two images may represent component images of the 3-D matrix barcode 104, as the combination of both the images may produce the entire 3-D matrix barcode 104. The images (e.g., audiovisual content or the matrix barcode 104) may be related to one another, but slightly offset (based on differing perspectives). The human brain may analyze the differences between the two images to perceive a 3-D image. The calculation within the brain may take into account the distance between each eye, the distance to the object, and the like. Thus, the image may be perceived as having a certain depth, although it is displayed on a two dimensional display device 106. This depth may be varied (as seen by the viewer 100) per object or portions of each object. For example, certain portions of the matrix barcode 104 may appear closer to the viewer than other areas of the matrix barcode 104.

In some embodiments, the image viewer device 102 may allow the right eye of the viewer 100 to see one image and the left eye of the viewer 100 to see the second image. For example, the image viewer device 102 may include shutters, color screens or other filters to vary the image presented to each eye. In other embodiments, the display device 106 and/or the content receiver 108 may display content and/or the matrix barcode 104 in a format that may allow the viewer 100 to perceive the content and/or matrix barcode 104 in 3-D without the image viewer device 102. For example, in some embodiments an autostereoscopy display may be used.

In the embodiment illustrated in FIG. 1B a mobile electronic device 101 may be used in addition to or instead of the image viewer device 102. In this embodiment, the mobile electronic device 101 may include a capture device having an optical component, such as a camera, to capture the matrix barcode 104. The mobile electronic device 101 may then use the matrix barcode 104 to access or present certain data (e.g., a website, coupon code, and so on) to the viewer 100 or may transmit the matrix barcode 104 to another computing device and/or the content receiver 108. This embodiment may be useful if the display device 106 is configured to depict an image that may be able to be perceived by the viewer 100 in 3-D without the image viewer device 102.

The mobile electronic device 101 may be any type of computing device with a capture device. For example, the mobile computing device 101 may be a remote control for the content receiver 108, a smart, phone, a tablet computer with a camera, a digital camera, and so on.

Figure 2:
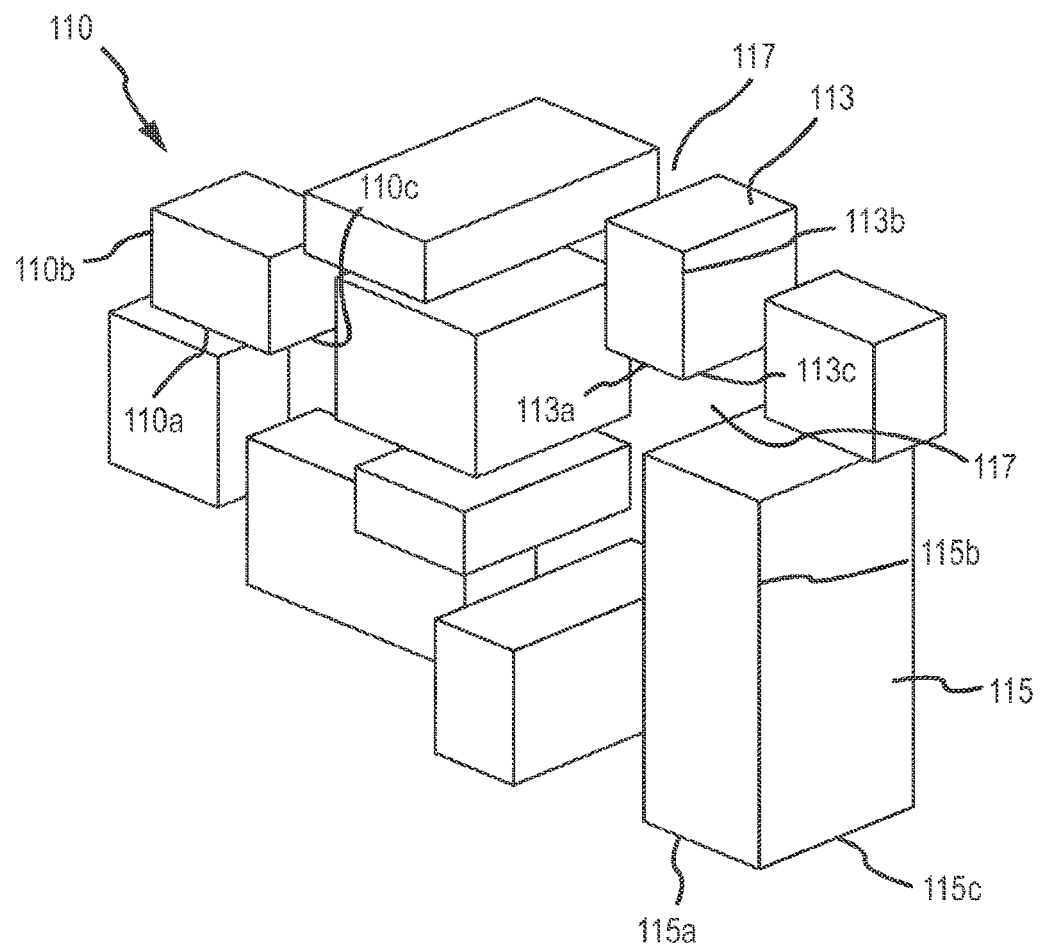
FIG. 2 is a front isometric view of a portion of the matrix barcode projected in 3-D as perceived by the viewer.

FIG. 2 illustrates an exemplary embodiment of a perceived 3-D image of the matrix barcode 104. The matrix barcode 104 may be either recorded in 3-D (e.g., using two different cameras to capture the image) or may be recorded in 2-D and then encoded to be perceived in 3-D. In either embodiment, the viewer 100 may view the matrix barcode 104 in three dimensions, as the matrix barcode 104 may include blocks having a height, width, and depth (as perceived by the viewer 100). The matrix barcode 104 may include data in the horizontal and vertical directions. For example, the matrix barcode 104 may include blocks 110, 113, and 115, as well as white spaces 117. Both the blocks 110, 113, 115 (which may be black, grayscale, or colored) and the white spaces 117 may be used to convey data. The blocks 110, 113, 115 (and white spaces 117) may be displayed in alternating heights, depths, and/or colors. Each variable (e.g., height, width, depth) that may be changed may allow for additional bits of data to be stored and/or conveyed via the matrix barcode 104. For example, certain blocks 110, 113, 115 may be one color representing an additional data bit and other blocks 110, 113, 115 may each be alternate colors representing other data bits.

Additionally, the blocks 110, 113, 115 may include data in the horizontal, vertical and depth dimensions. For example, block 110 may include a length 110a, a height 110b and a depth 110c Each of these dimensions 110a-110c may be individually varied so as that the block 110 may represent a variety of information. Similarly, blocks 113, 115 may include a length 113a, 115a; a height 113b, 115b; and a depth 113c, 115c, respectively, The depth blocks 110c, 113c, 115c, may represent the distance the matrix barcode 104 may appear (as perceived by the viewer 100) from the display device 102. The depth blocks 110c, 113c, 115c, may be included as metadata within a signal for the matrix barcode 104 (for example, if the original matrix barcode 104 image is in two dimensions), or may be included in the matrix barcode 104 (for example, if the original matrix barcode 104 is already configured to be in 3-D). In some embodiments, the depth blocks 110c, 113c, and 115c may provide additional information that may be conveyed in a digital signal (e.g., broadcast signal) sent to the content receiver 108, display device 108, and/or the image viewer device 102 to create the 3-D appearance, e.g., the depth blocks 110c, 113c and 115c may relate to a desired viewpoint, focal point or lens angle.

In some embodiments, the 3-D appearance of the matrix barcode 104 may be perceived by the viewer 100 as the viewer 100 views two separate images. Each image may be a component image of the 3-D matrix barcode 104, as the combination of the images may represent the 3-D matrix barcode 104. For example, in some embodiments, the display device 106 may display a first component image of the matrix barcode 104 and a second component image of the matrix barcode 104. The two images may be displayed either simultaneously and offset from one another or consecutively. In either embodiment, the image viewer device 102 may be configured to create a 3-D appearance for the matrix barcode 104 when viewed by the viewer 100.

Figure 3:
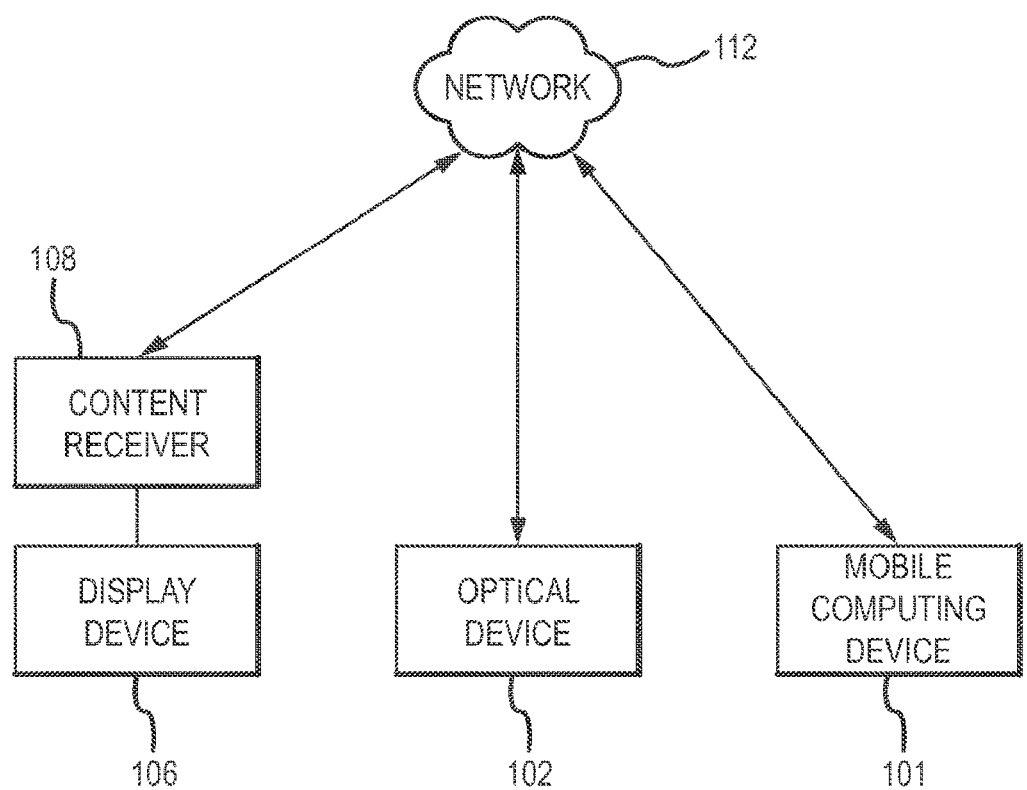
FIG. 3 is a block diagram illustrating a content receiver in communication with a display device and in communication with the optical device via a network.
Figure 4:
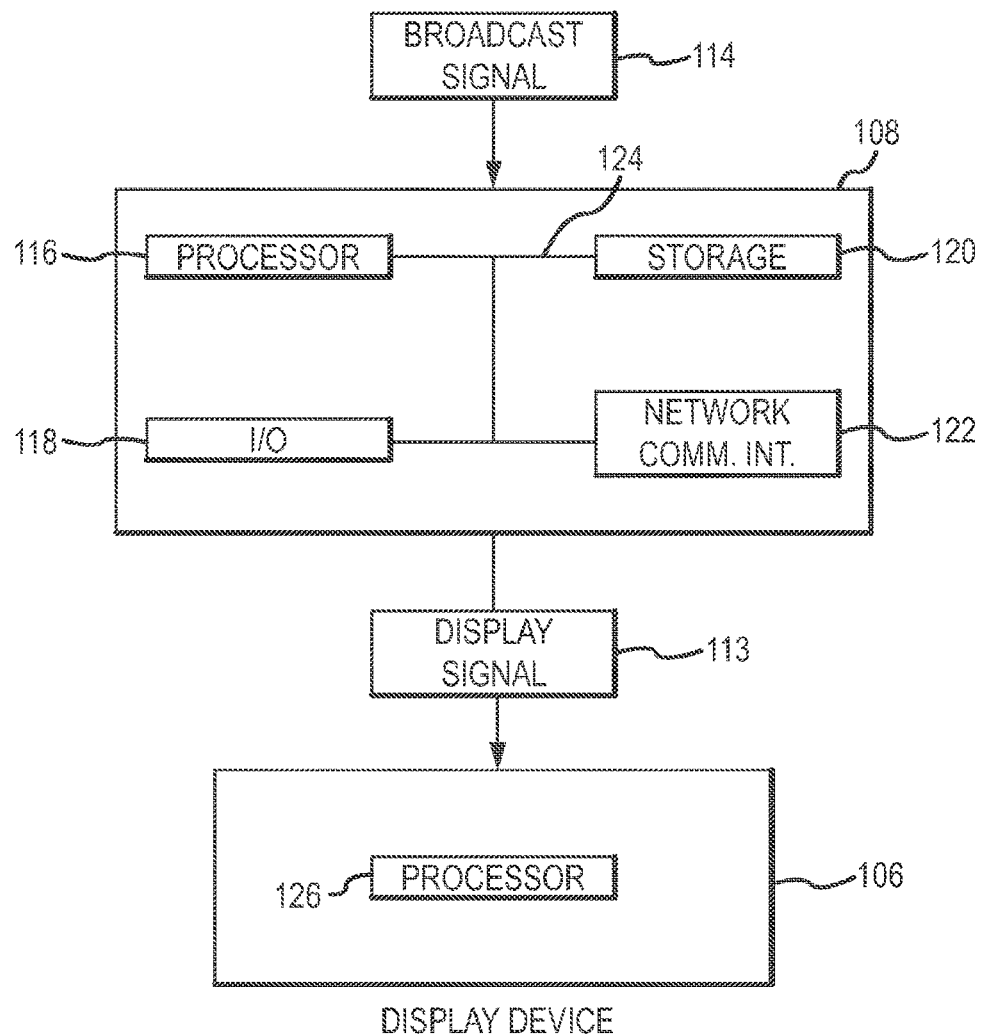
FIG. 4 is a block diagram illustrating a block diagram of the content receiver receiving a broadcast signal and communicating a display signal to the display device.

FIG. 3 is a block diagram illustrating the content receiver 108 in communication with the display device 106 and in communication with the image viewer device 102 via a network 112. FIG. 4 is a block diagram illustrating the content receiver 108 receiving a broadcast signal 114 and communicating a display signal 118 to the display device 106, The content receiver 108 is in communication with the display device 106 and may transmit content and/or the matrix barcode 104 to the display device 108. Additionally, the image viewer device 102 or mobile computing device 101 captures the matrix barcode 104 and then may transfer the matrix barcode 104 to the content receiver 108 via the network 112, The network 112 may be virtually any type of electronic communication mechanism/path and may be wireless or wired, or a combination of wired and wireless, for example, the network 112 may include the internet, Ethernet, universal serial bus cables (USB), radio signals (e.g., WiFi, Bluetooth®), and so on.

The broadcast signal 114 may be transmitted to the content receiver 108 via the network 112 from a broadcast center or content source. The broadcast signal 114 may include content, such as audiovisual content. In some embodiments, the display signal 113 may be substantially the same as the broadcast signal 114, but, in other embodiments, the display signal 113 may be a modified form of the broadcast signal 114 and/or a different signal altogether. For example, in some embodiments, the content receiver 103 may process the broadcast signal 114 to display a 3-D image to the viewer 100 and thus may alter the broadcast signal 114. In other embodiments, the display signal 113 may be a signal from another input to the content receiver 108, such as a digital video disc (DVD) drive, USB port and the like.

The broadcast signal 114 and/or the display signal 113 may include the matrix barcode 104. The matrix barcode 104 may be included along with a video signal, audio signal, or other electronic signal. For example, the matrix barcode 104 may be configured to be displayed along with particular content (e.g., a television show).

The content receiver 106 may be practically any type of computing device able to receive and process audio, video and/or data signals. For example, the content receiver 106 may be a set top box, a television receiver, a digital video recorder, a computer, and so on. The content receiver 106 may receive practically any form/type of content from almost any number of sources. This may include the broadcast signal 114, recorded audio/video, streaming data from the Internet, downloaded data, and so on.

In some embodiments, the content receiver 108 may include a network/communication interface 122, memory storage 120, a processor 116, and an input/output interface 118 all connected via a system bus 124. Additionally, the content receiver 106 may also include an optical drive (e.g., digital video disc player, compact disc player, nigh definition digital video disc player), a universal serial bus drive, or other electronic inputs.

The network/communication interface 122 may receive the broadcast signal 114 from a broadcast headend (not shown), the network 112, and/or other communication mechanisms. Additionally, the network/communication interface 122 may also communicate with the image viewer device 102, the mobile computing device 101, and/or any other computing devices communicating with the content receiver 106 via the network 112.

The memory storage 120 may store electronic data that may be utilized by the content receiver 108. For example, the memory storage 120 may store content (e.g., video/audio signals), an electronic programming guide, user preference data (e.g., language or time zone), or settings data. The memory storage 120 may be, for example, a magnetic storage medium, optical storage medium, magneto-optical storage medium, read only memory, random access memory, erasable programmable memory, flash memory, and so on.

The processor 118 may control operation of the content receiver 108. The processor 118 may be any electronic device cable of processing, receiving, and/or transmitting instructions. For example, the processor 116 may be a microprocessor or a microcomputer.

The input/output interface 118 provides for communication by the content receiver 108 to and from a variety of devices/sources. For example, the input/output interface 118 may receive data from the image viewer device 102, the mobile computing device 101, a remote control, control buttons located on the content receiver 108, or other computing devices. Additionally, the input/output interface 118 may also receive/transmit data to and from an optical disc drive (e.g., digital video disc drive), USB drive, or other video/audio/data inputs (e.g., signals from a video game console). The input/output interface 113 may also provide the display signal 113 to the display device 106.

The display device 106 may be in electronic communication with the content receiver 108. Additionally, in other embodiments, the content receiver 108 may be incorporated info the display device 106. The display device 106 may be configured to present/output the content and/or data. For example, the display device 106 may be a television display or a computer monitor capable of presenting audio, video and data signals, The display device 106 may be any kind of electronic display such as, a cathode ray tube display, a liquid crystal display, or a plasma display. Additionally, the display device 106 may also have or be connected to speakers. Furthermore, the display device 108 may also include a processor 128 in order to process the display signal 113. The processor 128 may be any type of device configured to process electronic signals, such as a microprocessor, microcomputer, and the like.

Figure 5:
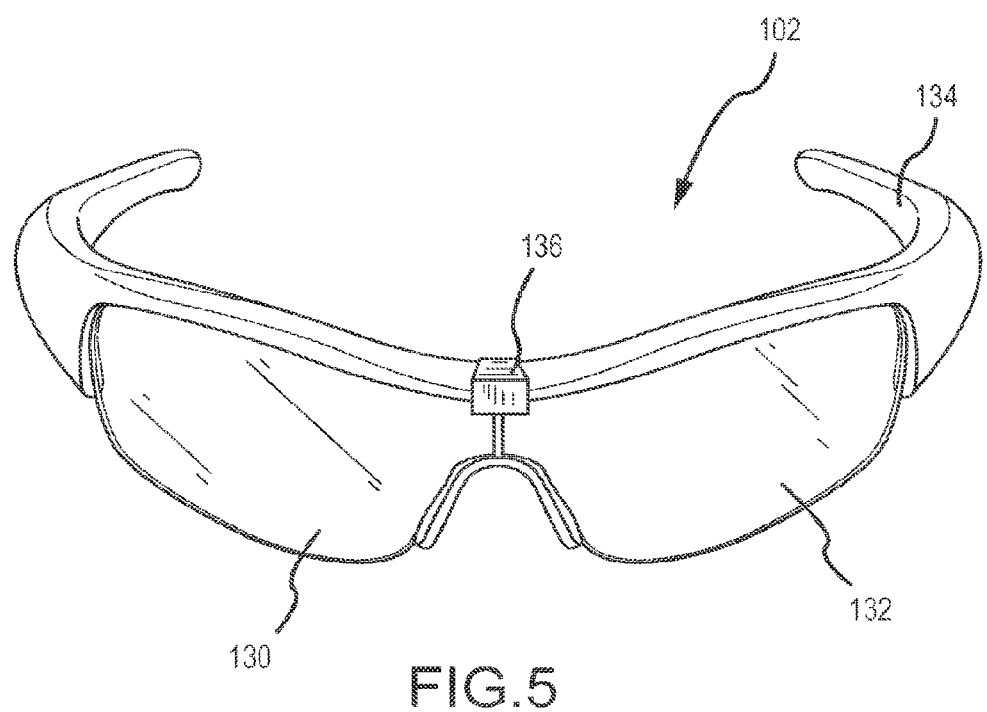
FIG. 5 is a front isometric view of an embodiment of the optical device.

FIG. 5 is front isometric view of the image viewer device 102. The image viewer device 102 may be worn by the viewer 100 to present the content in 3-D, when the viewer's 100 brain interprets the images. Additionally, the image viewer device 102 may also be used to capture the matrix barcode 104 (see e.g., FIG. 1A). The image viewer device 102 may be used to capture the matrix barcode 104 as it is presented in either 3-D or in 2-D. For example, if the matrix barcode 104 is presented on the display device 106 in only two dimensions (e.g., a single image), the image viewer device 102 may capture the single image. In other embodiments, the image viewer device 102 may capture the 3-D representation of the matrix barcode 104, e.g., the image viewer device 102 may capture both component images of the matrix barcode 104, either as the image components are presented simultaneously or sequentially.

The image viewer device 102 may include lenses 130, 132, a frame 134, and/or an image capture device 136. The lenses 130, 132 may each be positioned between the display device 108 and the viewer 100. The lenses 130, 132 prevent certain portions of the image (e.g., frames, polarities, colors, wavelengths) from reaching the respective eye of the viewer 100. For example, the lenses 130, 132 may be different colors, have different polarization filters, or may include an intermittent shade (or shutter) to block one eye at a time. The lenses 130, 132 may be glass, plastic, and/or other transparent materials. The lenses 130, 132 may be operably connected via the frame 134. The frame 134 may also support the image viewer device 102 on the viewer's 100 head/face.

Figure 6:
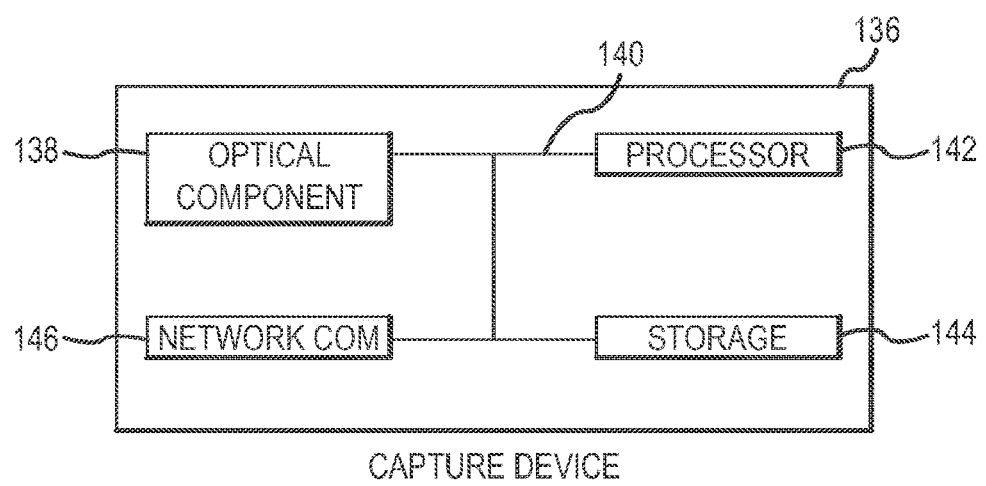
FIG. 6 is a block diagram of an image capture device that may be incorporated into the image viewer device or the mobile computing device, illustrated in FIGS. 1A and 1B, respectively.

FIG. 6 is a block diagram of an exemplary embodiment of a capture device 138. The image capture device 138 may be used to capture images of the matrix barcode 104 as it is displayed on the display device 105. The image capture device 138 may be incorporated into either the image viewer device 102 (see e.g., FIG. 5) or the mobile computing device 101. The image capture device 130 may include an optical component 138, a network interface component 146, an electronic storage component 144, and/or a processor 142 connected together via a system bus 140.

The optical component 138 may be used to capture the matrix barcode 104 and its corresponding depth data (e.g., depth blocks 110c, 113c, 115c). The optical component 138 may be any type of device that may be used to optically read and/or capture images and/or data. For example, the optical component 133 may be a charge-coupled device (CCD) camera, a camera with a rotating polarization filter, another type of camera, and so on. Additionally, there may be multiple optical components 138. For example, in embodiments where the image capture device 136 is incorporated into the image viewer device 102, there may be a separate optical component 138 for each of the right lens 130 and the left tens 132. In other embodiments, for example, when the image capture device 138 is incorporated into the mobile computing device 101, there may be a single optical component 138.

The optical component 138 may take a one or more images of the matrix barcode 104, for example, successive images of the matrix barcode 104. For example, in some embodiments, two images (e.g., component images) of the matrix barcode 104 may be displayed successively, repeatedly alternating, in order to present a 3-D appearance, in these embodiments, the optical component 138 may capture an even frame as the first component image and capture an odd frame as the second component image and process the offset data between the two images in order capture all of the data (e.g., blocks 110, 113, 115) represented by the matrix barcode 104. Alternately, the optical component 138 may record orthogonal images as the component images using, for example, orthogonal polarizing filters to capture the components of the displayed image.

The network communication interface 146 may communicate between a computing device or the content receiver 108. For example, the network communication interface 148 may send the matrix barcode 104 to the content receiver 108. The network communication interface 148 may be configured to communicate via a wireless, wired, or a combination of wired and wireless networks. For example, the network communication interface 148 uses the network 112 to communicate with the content receiver 108. In some embodiments, the image capture device 138 may communicate via a Bluetooth® or WiFi connection, or other local area network (LAN) and the like to a computing device or the content receiver 108 in order to transmit the matrix barcode 104.

The processor 142 may operate the components of the image capture device 136. For example, the processor 142 may cause the network communication interface 148 to transfer the matrix barcode 104 to the content receiver 108. The processor 142 may be a microcomputer, microprocessor, or the like.

The storage component 144 may store the matrix barcode 104 after it is captured via the optical component 138. The storage component 144 may be any type of electronic data storage, such as a magnetic storage medium, optical storage medium, magneto-optical storage medium, read only memory, random access memory, erasable programmable memory, flash memory, and so on.

Figure 7:
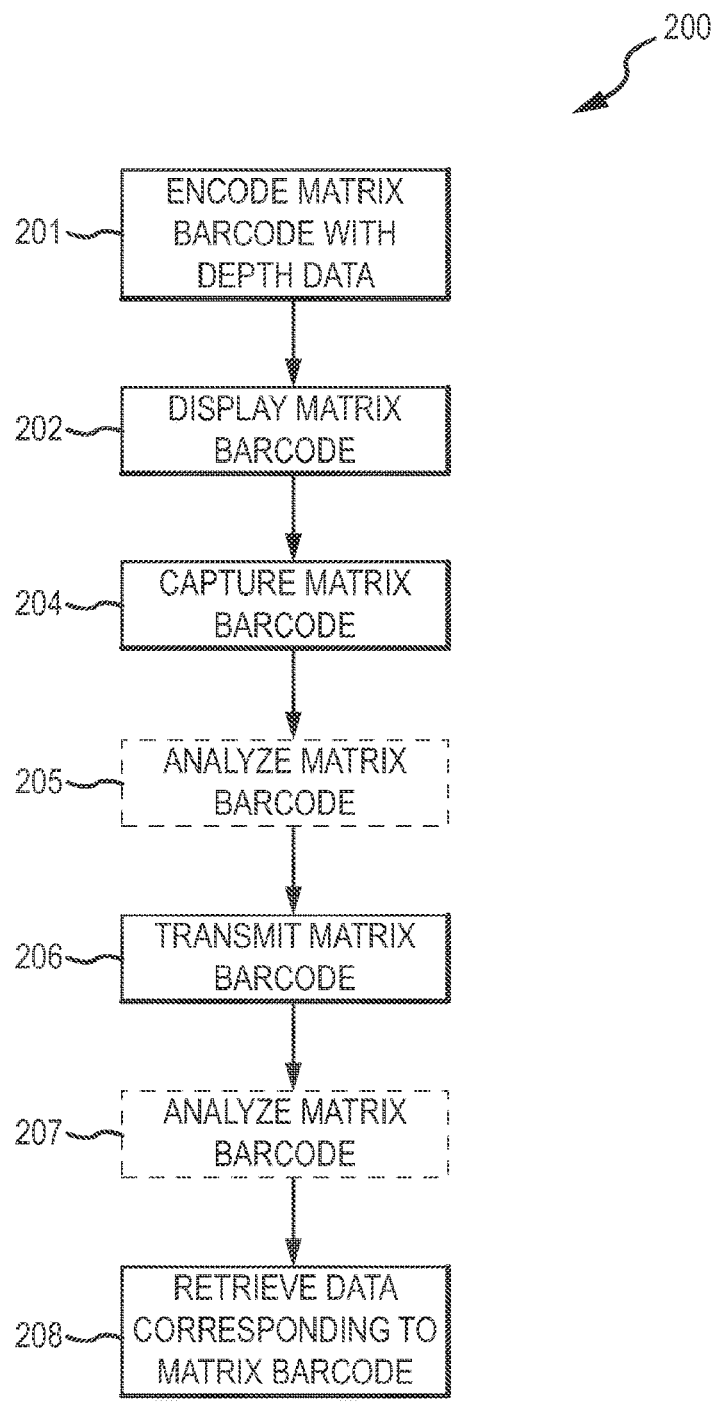
FIG. 7 is a flow chart for a method for accessing data, corresponding to the matrix barcode.

FIG. 7 is an embodiment of a method 200 for displaying and capturing a matrix barcode 104 configured to appear in 3-D. The method 200 begins at an operation 201 where the matrix barcode 104 is encoded with depth data, i.e., data corresponding to a depth dimension 110c, 113c, 115c of blocks 110, 113, 115. The depth data may indicate the relative depth that each particular block 110, 113, 115 may be perceived to have by the viewer 100. This operation 201 may be completed prior to the content receiver 108 receiving the broadcast signal 114 (e.g., it the broadcast signal 114 is already configured to be displayed in 3-D). For example, the broadcast signal 114 may include video content recorded in 3-D by using two cameras separated by the average distance between a human's right eye and left eye. In other embodiments, operation 201 may be completed by the content receiver 108 or the display device 108 (e.g., if the display device 106 is configured to modify a 2-D broadcast signal 114 to be displayed in 3-D). The depth data (e.g., depth dimensions 110c, 113c. 115c) may be included as metadata in the broadcast signal 114. The metadata may be coded to translate to the depth data in the 3-D display of the matrix barcode 104. After the matrix barcode 104 has been encoded with the depth blocks 110c, 113c, 115c, the method 200 proceeds to operation 202.

In operation 202, the 3-D matrix barcode 104 is displayed. This operation 202 may be performed when the display device 106 projects the 3-D matrix barcode 10. As described above, the 3-D matrix barcode 104 may be projected as a series of images alternating on the screen. In these embodiments, the two component images of the 2-D matrix barcode may be alternatively displayed ate rate of approximately 80 Hertz, such that the viewer 100 may view the 3-D matrix barcode 104 in 3-D. For example, even numbered frames may display the first component image and odd numbered frames may display the second component image. In other embodiments, both images or components of the 3-D matrix barcode 104 may displayed simultaneously, but slightly offset from one another. This may allow the image to be constantly projected on the screen (i.e., not alternating) while still allowing the viewer to view the 3-D matrix barcode 104. In 3-D. Furthermore, the 3-D matrix barcode 104 may be displayed in varying colors, and/or the two images of the matrix barcode 104 may include separate colors.

After the 3-D matrix barcode 104 has been displayed, the method 200 proceeds to operation 204. In this operation 204, the 3-D matrix barcode 104 is captured via the optical component 138. As discussed above, the optical component 138 may be incorporated (via the image capture device 136) into the mobile computing device 101 (e.g., remote control, smart phone) or the image viewer device 102 (e.g., glasses). In some implementations, this operation 204 may be two separate acts. For example, if the 3-D matrix barcode 104 is displayed in consecutive content frames, two separate images or components of the 3-D matrix barcode 104 may be captured in series. In this example, a first image component may be displayed on an even numbered frame and a second image component may be displayed on an odd numbered frame. In other embodiments, this operation 204 may be preformed in a single step. For example, if the two images or components are projected simultaneously, both images or components may be captured simultaneously by two separate optical components 138 or via a single optical component 136 configured to capture 3-D images (e.g., camera with a rotating polarizing filter).

After the matrix barcode 104 is captured, the method 200 may proceed to operation 205. In operation 205. the 3-D matrix barcode 104 may be analyzed to determine the embedded data. Operation 205 may be performed prior to operation 208 if, for example, the mobile computing device 101 captures the 3-D matrix barcode 104, the mobile computing device 101 may then analyze the 3-D matrix barcode 104 to determine the data prior to proceeding to operation 206. The data may include a website address, coupon code, television show title, and/or other information. Operation 205 may involve analyzing the 3-D matrix barcode 104 and may be performed by a scanner configured to analyze matrix barcodes, a smart phone having a software program installed configured to analyze matrix barcodes, or via other computing devices. For example, the mobile computing device 101 may use a software program to decode the matrix barcode 104 and extract the data. In other embodiments, the method 200 may proceed directly from operation 204 to operation 206. For example, if the image capture device 136 captures the 3-D matrix barcode 104 the image viewer device 102 may transmit the 3-D matrix barcode 104, prior to analyzing the 3-D matrix barcode 104 to determine the data.

In operation 206, the 3-D matrix barcode 104 may be transmitted from the image capture device 136 to the content receiver 103 or other computing device. In this embodiment, the network interface component 146 of the image capture device 136 may transmit the 3-D matrix barcode 104 via the network 112 to the network interface 122 on the content receiver 104.

After the 3-D matrix barcode 104 has been transmitted, the method 200 may proceed to operation 207 and the 3-D matrix barcode 104 may be analyzed. For example, if the image capture device 136 in the image viewer device 102 captured the 3-D matrix barcode 104, the 3-D matrix barcode 104 may not have been analyzed in optional operation 205. Therefore, in operation 207, the 3-D matrix barcode 104 is analyzed to extract the data stored within the 3-D matrix barcode 104. Operation 207 may be substantially the same as operation 205, except that operation 207 may occur on a device other than the device that captured the 3-D matrix barcode 104.

After operations 206 and 207, the method 200 may proceed to operation 208. In this operation 208, content corresponding to the 3-D matrix barcode 104 is retrieved. In some embodiments, operation 206 may be omitted and the method 200 may proceed directly from operation 204 to operation 208. For example, if the mobile computing device 101 captures the 3-D matrix barcode 104, then the mobile computing 101 device may perform operation 208 and retrieve data corresponding to the 3-D matrix barcode 104.

After the 3-D matrix barcode 104 has been analyzed, content corresponding to data stored within the 3-D matrix barcode 104 may be retrieved. For example, the 3-D matrix barcode 104 may include data corresponding to a website address and the mobile computing device 101 may open a browser window and display the website. Similarly, the 3-D matrix barcode 104 may be transmitted to a personal computer via a LAN or other network, and the personal computer may then open a browser window and display the webpage. In another embodiment, the image viewer device 102 may capture the matrix barcode 104 (via the image capture device 136) and then transmit the matrix barcode 104 to the content receiver 108. The 3-D matrix barcode 104 may include data corresponding to a television show (e.g., show title, time, channel) and the content receiver 108 may search the broadcast signal 114 (or other source) for the television show and then, via the display device 106. display the television show, an schedule automatic recording, of the television show, retrieve information over the Internet for presentation on the display device 106, or perform some other function in response to the information.

Figure 8:
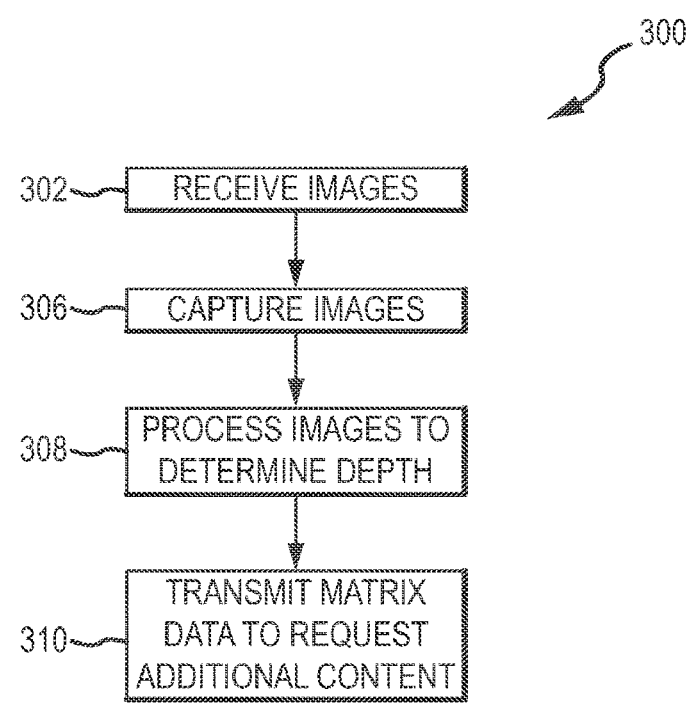
FIG. 8 is a flow chart for a method for capturing and accessing data corresponding to the matrix barcode.

FIG. 8 is an embodiment of a method 300 for capturing, and transmitting the matrix barcode 104 configured to appear in 3-D. The method 300 begins with receiving the matrix barcode code 104 images in operation 302. For example, the broadcast signal 114 may include a television show with the 3-D matrix barcode 104 superimposed thereon, and then the television show and the 3-D matrix barcode 104 may be presented on the display device 102. As discussed above, the 3-D matrix barcode 104 may be presented as two separate images (either successively or simultaneously) in order to be perceived in 3-D. In operation 302 the mobile computing device 101, the viewer 100, or the image viewer device 102 may receive the images.

After the 3-D matrix barcode 104 is received, the method 300 may proceed to operation 306 and the two images or components of the matrix barcode 104 are captured. This operation 306 may be performed by the image capture device 136 either incorporated into the image viewer device 102 or the mobile computing device 101. The image capture device 136 may capture the two images simultaneously or as two separate images. In some embodiments, the optical component 138 may include two separate lenses or a rotating filter In front of a lens. For example, the optical component 138 may include a rotating filter. The rotating filter may use polarization or other filtering mechanisms to create a different filter for a single lens between each image that is captured. In this embodiment, a first polarization filter (e.g., clockwise circular polarizing filter) may be placed in front of the fens and a first image or component of the 3-D matrix barcode 104 may be captured. Then, the rotating filter may rotate and a second filter with a different polarization (e.g., a counterclockwise circular polarizing filter) may be placed in front of the lens, and the second image or component of the 3-D matrix barcode 104 may be captured. In other embodiments, the optical component 138 may include two separate lenses, where each lens may have a different polarization or filler, such that the image or component captured by each lens may be different than the other lens.

In one embodiment, the image capture device 138 captures the matrix barcode 104 as it is displayed with a television show (or other video content). For example, a remote control for the content receiver 108 may include the image capture device 138, Then, as the matrix barcode 104 is displayed the viewer 100 may select a button on the remote control device to capture the 3-D matrix barcode 10. The optical device 138 may then be activated and record the images of the 3-D matrix barcode 104.

The method 300 then proceeds to operation 308 and the images may be processed to determine the depth dimensions 110c, 113c, 115c of blocks 110, 113, 115, This operation 308 may be performed by the mobile computing device 101, the image capture device 130, or other computing device. This operation 308 may take into account the offset distance the component images of the 3-D matrix barcode 104 are from each other, the distance from the display device 106 that the 3-D matrix barcode 104 is perceived to be, and other data that corresponds to how the viewer 100 perceives the depth blocks 110c, 113c, 115c. For example, the distance that each block 110, 113, 115 may be offset from the two 2-D images of the 3-D matrix barcode may determine the depth dimensions 110c, 113, 115c. Therefore, the two 2-D images or components of the 3-D matrix barcode 104 may be evaluated to determine the distance each image or component appeared on the display device 108 as compared to the other image or component. For example, in one component image certain portions of blocks 110, 113, 115 may be displayed on a particular set of pixels on the display device 108 and in the second component image, the same portion of the blocks 110, 113, 115 may be displayed on a second set of pixels. The second set of pixels may be offset from the first set of pixels by a particular distance, this distance may correspond to the depth dimension 110c, 113c, 115c of each block 110, 113, 115. In other embodiments, data used to create 3-D matrix barcode 104 may be analyzed to determine the depth dimensions 110c, 113c, 115c of each block 110, 113, 115.

The method 300 then may proceed to operation 310 and the 3-D matrix barcode 104 (or data corresponding to the 3-D matrix barcode 104) is transmitted to access additional content. In some embodiments, the image viewer device 102 may capture the images of the 3-D matrix barcode 104 and transmit the images to a computing device to be analyzed. This may be beneficial, as the processing power required to transmit the images may be minimal, as compared with embodiments where the image viewer device 102 may analyze the 3-D matrix barcode 104 to extract the data from it. Therefore, the processor 142 in the image capture device 138 may not need to be too powerful, and thus may be less expensive. Similarly, the image capture device 136 may be incorporated into a remote control device for the content receiver 108, and in these embodiments the remote control device may transmit the images of the 3-D matrix barcode 104 along with data corresponding to other remote control commands (e.g., channel selection, power). After the images are transferred to another computing device (e.g., the mobile computing device 101, the content receiver 108, personal computer), the data corresponding to the images of the 3-D may be extracted.

In other embodiments, data corresponding to the 3-D matrix barcode 104 may be transmitted rather than the images. For example, if the image capture device 138 is incorporated into the mobile computing device 101, the processor 142 may be more powerful than if the image capture device 136 is incorporated info the image viewer device 102. Therefore, in these embodiments, the mobile computing device 101 may extract the data corresponding to the 3-D matrix barcode 104 and thus may transmit the data corresponding to the 3-D matrix barcode 104.

The additional content that may be accessed based on the data within the 3-D matrix barcode may be a URL and the image viewer device 102 may transmit the matrix barcode 104 to a computer in order to access the webpage. The computer may receive the matrix barcode 104 and then open a browser window and display the webpage. In another embodiment, the mobile computing device 101 may transmit the 3-D matrix barcode 104 from the optical component 138 to a processor in order to access the content corresponding to the matrix barcode 104.

Embodiments herein may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium: read only memory (ROM); random access memory (RAM); erasable programmable memory (e.g., EPROM and EEPROM); flash memory; and so on.

In methodologies directly or indirectly set forth herein, various steps and operations are described in one possible order of operation but those skilled in the art will recognize the steps and operation may be rearranged, replaced or eliminated without necessarily departing from the spirit and scope of the present invention. It is intended that all matter contained in the above description or shown in the accompanying drawings shall be interpreted as illustrative only and net limiting. Changes in detail or structure may be made without departing from the spirit of the invention as defined in the appended claims.

What we claim is:

1. A method implemented on a microprocessor controlled device comprising
    capturing a first component image of a matrix barcode and a second component image of the matrix barcode corresponding to a three-dimensional matrix barcode as presented on a display device, wherein the first component image corresponds to an even frame presented on the display device, and the second component image corresponds to an odd frame presented on the display device;
    processing with a microprocessor the first component image and the second component image to identify depth information for the three-dimensional matrix barcode; and
    decoding the depth information into data previously encoded into the three-dimensional matrix barcode.

2. The method of claim 1 further comprising capturing the first component image and the second component image of the matrix barcode on an image capture device component of the microprocessor-controlled device.

3. The method of claim 1, wherein
    the data comprises a location identifier; and
    the method further comprises transmitting a request for content to a location related to the location identifier; and
    receiving the content from the location.

4. The method of claim 3 further comprising presenting the content on a display device component of the microprocessor-controlled device.

5. The method of claim 1, wherein the microprocessor-controlled device is a smart phone.

6. The method of claim 1, wherein the microprocessor-controlled device is a remote control device.

7. The method of claim 2, wherein the capturing operation further comprises
    synchronizing a shutter on the image capture device component with a frame display rate of a display device.

8. The method of claim 2, wherein the capturing operation further comprises
    capturing the first component frame on the image capture device component through a filter having a first polarization; and
    capturing the second component frame on the image capture device component through a filter having a second polarization orthogonal to the first polarization.

9. The method of claim 8, wherein the capturing operation further comprises rotating the filter from a first orientation to a second orientation orthogonal to the first orientation between the step of capturing the first component frame and the step of capturing the second component frame.

10. The method of claim 1, wherein
    a portion of the matrix barcode has a color component other than black and white; and
    the method further comprises decoding data represented by the color component.

11. A method implemented on a microprocessor-controlled device comprising
    receiving a first component image of a matrix barcode and a second component image of the matrix barcode, wherein the first component image and the second component image correspond to a three-dimensional representation of the matrix barcode; and
    capturing via an image capture device, the first component image and the second component image, wherein the first component frame is captured on the image capture device through a filter having a first polarization and the second component frame is captured on the image capture device through a filter having a second polarization orthogonal to the first polarization.

12. The method of claim 11, further comprising processing via a microprocessor the first component image and the second component image to determine a depth data of the matrix barcode.

13. The method of claim 12, wherein a mobile computing device comprises the image capture device and the microprocessor.

14. The method of claim 13 further comprising accessing content at a location provided in data represented by and decoded from the three-dimensional representation of the matrix barcode.

15. The method of claim 13, wherein the image capture device comprises
    one or more filters configured to filter out the second component image of the matrix barcode; and
    the method further comprises controlling a selection or orientation of the one or more filters to alternately filter out the first component image and the second component image from capture by the image capture device.

16. A computer program product comprising
    a first set of instructions, stored in at least one non-transitory storage medium, executable by at least one processing unit to capture a first component image of a matrix barcode and a second component image of the matrix barcode corresponding to a three-dimensional matrix barcode as presented on a display device, wherein the first component image corresponds to an even frame presented on the display device, and the second component image corresponds to an odd frame presented on the display device;
    a second set of instructions, stored in at least one non-transitory storage medium, executable by at least one processing unit to process a first component image of a matrix barcode and a second component image of the matrix barcode corresponding to a three-dimensional matrix barcode presented on a display device to identify depth information for the three-dimensional matrix barcode; and a third set of instructions, stored in the at least one non-transitory storage medium, executable by the at least one processing unit to decode the depth information into data previously encoded into the three-dimensional matrix barcode.

17. The computer program product of claim 16 further comprising a fourth set of instructions, stored in the at least one non-transitory storage medium, executable by the at least one processing unit to capture the first component image and the second component image of the matrix barcode on a capture device component of the microprocessor-controlled device.

18. The computer program product of claim 17, wherein the capturing operation further comprises operations to synchronize a shutter on the image capture device component with a frame display rate of a display device.

19. The computer program product of claim 16, wherein the data comprises a location identifier; and further comprising a fourth set of instructions, stored in the at least one non-transitory storage medium, executable by the at least one processing unit to transmit a request for content to a location related to the location identifier; and a fifth set of instructions, stored in the at least one non-transitory storage medium, executable by the at least one processing unit to receive the content from the location.

20. The computer program product of claim 16, further comprising a fourth set of instructions, stored in the at least one non-transitory storage medium, executable by the at least one processing unit to present the content on a display device component of the microprocessor-controlled device.

* * * * *